(12) United States Patent
Chang

(10) Patent No.: US 11,869,729 B2
(45) Date of Patent: Jan. 9, 2024

(54) KEY STRUCTURE

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventor: Chih-Wei Chang, New Taipei (TW)

(73) Assignees: HONGFUJIN PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 44 days.

(21) Appl. No.: 17/716,242

(22) Filed: Apr. 8, 2022

(65) Prior Publication Data

US 2023/0178312 A1 Jun. 8, 2023

(30) Foreign Application Priority Data

Dec. 6, 2021 (CN) .......................... 202111481332.2

(51) Int. Cl.
*H01H 13/14* (2006.01)
*H01H 13/10* (2006.01)
*H01H 13/20* (2006.01)

(52) U.S. Cl.
CPC ............ *H01H 13/14* (2013.01); *H01H 13/10* (2013.01); *H01H 13/20* (2013.01); *H01H 2233/07* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 10,572,018 B2 * | 2/2020 | Yang | ...................... G06F 3/0202 |
| 2017/0330704 A1 | 11/2017 | Chen | |
| 2018/0019080 A1 | 1/2018 | Chen | |

FOREIGN PATENT DOCUMENTS

| | | |
|---|---|---|
| TW | 201740413 A | 11/2017 |
| TW | M561318 U | 6/2018 |

* cited by examiner

*Primary Examiner* — Ahmed M Saeed
(74) *Attorney, Agent, or Firm* — ScienBiziP, P.C.

(57) ABSTRACT

A key structure includes an upper cover, a movable element, an elastic element, a pressure sensing module, a base, and a circuit board. The pressure sensing module is arranged on the base, and the pressure sensing module is electrically connected with the circuit board. The pressure sensing module includes a pressure sensing element and a conducting element, and the pressure sensing element is configured for contacting with the movable element after being pressed, monitoring a pressure on the movable element, and converting the pressure into a pressure signal; the conducting element is configured for conducting the pressure signal to the circuit board.

9 Claims, 12 Drawing Sheets

KEY STRUCTURE

FIELD

The subject matter herein generally relates to a key structure, and more particularly, to a mechanical key structure.

BACKGROUND

Input devices with mechanical keys have been used. The mechanical key includes a movable element and an elastic element disposed below the movable element. When the user presses or releases the movable element, and the elastic element is pressed and released, and an on/off electrical signal is generated to convey the user's instruction.

However, the single mechanical key can only provide a simple on/off signal when being pressed. The mechanical key cannot provide a composite signal. Thus, the type of instruction input by the user is limited, which cannot meet the needs of users.

Figure 1:
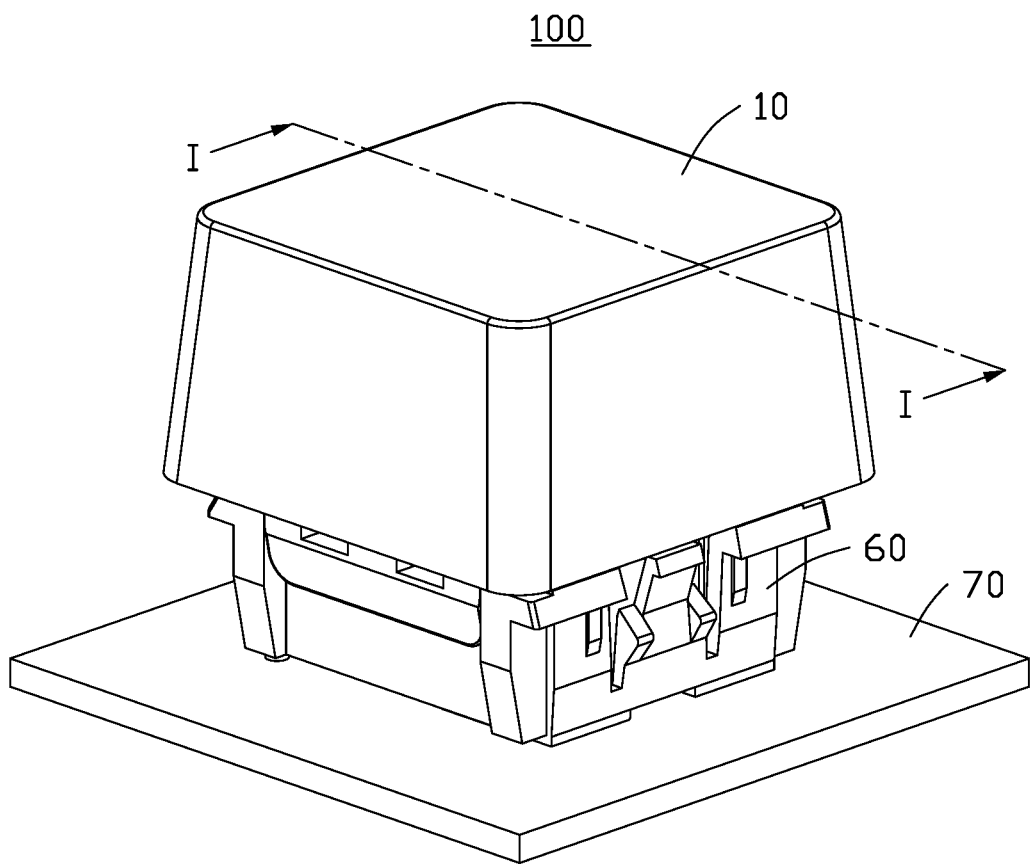
FIG. 1 is a diagrammatic view of a key structure according to an embodiment of the present disclosure.

The following detailed description will further describe the embodiments of the present disclosure with reference to the above drawings.

DETAILED DESCRIPTION

Unless otherwise defined, all technical and scientific terms used herein have the same meaning as commonly understood by persons skill in the art. The terms used herein are only for the purpose of describing specific embodiments, and not intended to limit the embodiments of the present application.

In this application, descriptions such as "first", "second" etc. are only used for description purposes and should not be understood as indicating or implying their relative importance or implying the number of indicated technical features. Thus, a feature defined as "first" and "second" may expressly or implicitly include at least one of that features. In the description of the present application, "plurality" means more than one unless expressly and specifically defined otherwise.

The embodiments of the present application are described here with reference to sectional views, which are schematic diagrams of idealized embodiments (and intermediate structures) of the present application. Therefore, the difference in the shape of the drawing due to the manufacturing process and/or tolerance is predictable. Accordingly, the embodiments of the present application should not be interpreted as limited to the specific shape of the area illustrated here, but should include, for example, the deviation of the shape due to manufacturing. The areas shown in the drawings are only schematic, and their shape is not used to illustrate the actual shape of the device, and is not used to limit the scope of the present disclosure.

Some embodiments of the present application will be described in detail below with reference to the drawings. The following embodiments and features of the embodiments may be combined with each other in the absence of conflict.

First Embodiment

Figure 2:
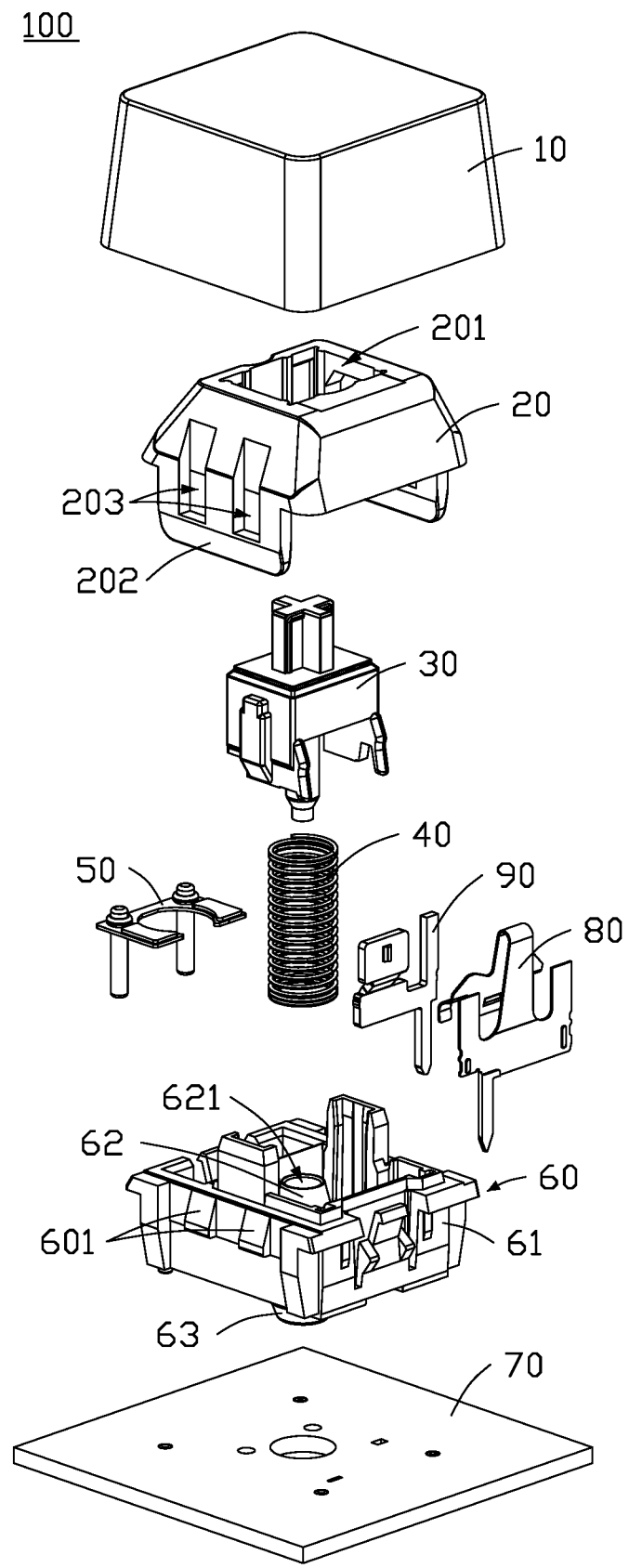
FIG. 2 is an exploded view of the key structure of FIG. 1.

Referring to FIGS. 1 and 2, the first embodiment provides a key structure 100, including a key cap 10, an upper cover 20, a movable element 30, an elastic element 40, a pressure sensing module 50, a base 60, and a circuit board 70. The upper cover 20 defines an opening 201 passing through the upper cover 20, and an end of the movable element 30 is connected with the key cap 10 through the opening 201. The elastic element 40 is sleeved on the movable element 30. The pressure sensing module 50 is arranged on the base 60 and electrically connected with the circuit board 70. The base 60 is adapted to the upper cover 20, and the elastic element 40 and the pressure sensing module 50 are arranged in the space enclosed by the upper cover 20 and the base 60.

Figure 4:
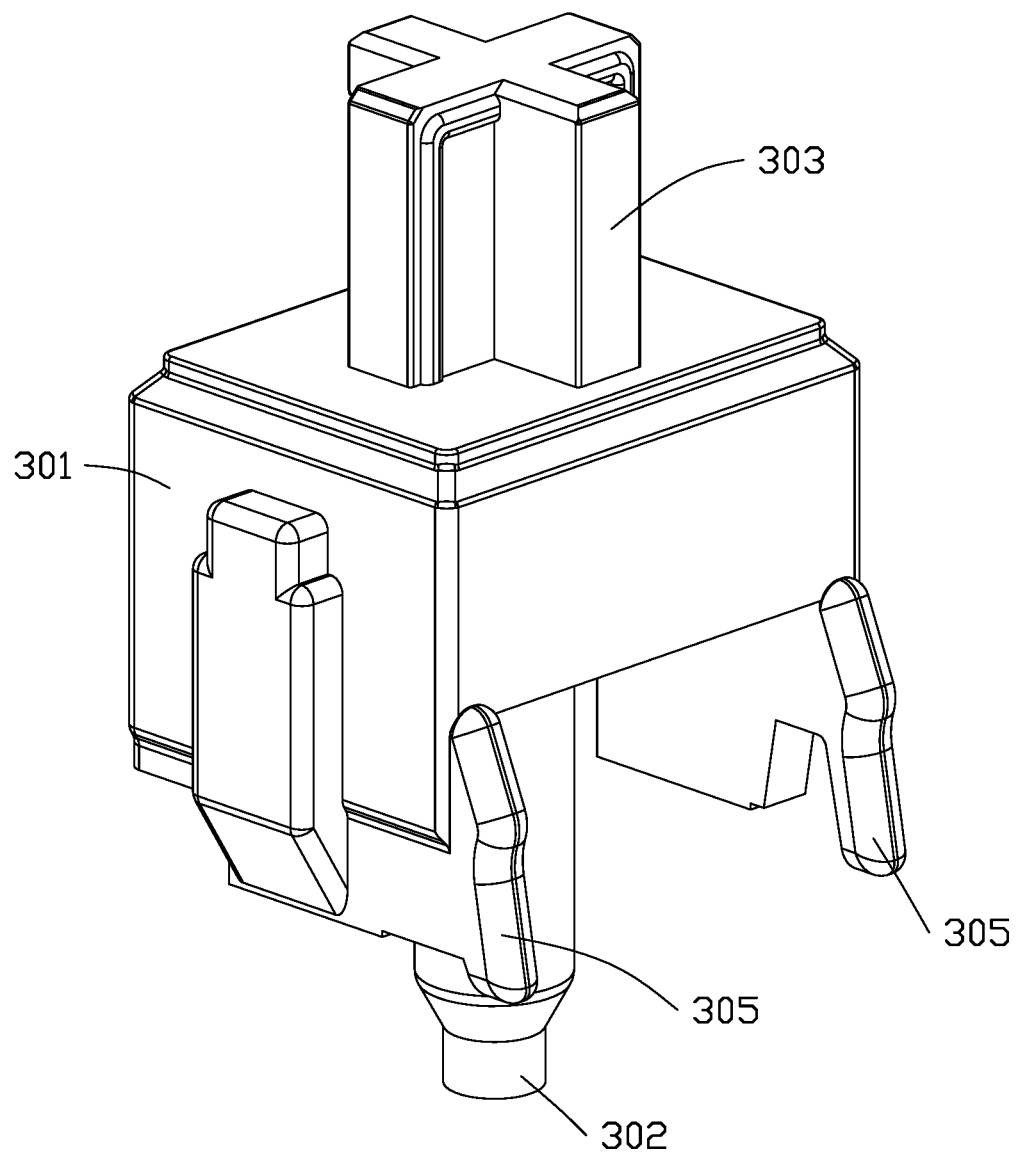
FIG. 4 is a diagrammatic view of a movable element of the key structure of FIG. 2.
Figure 5:
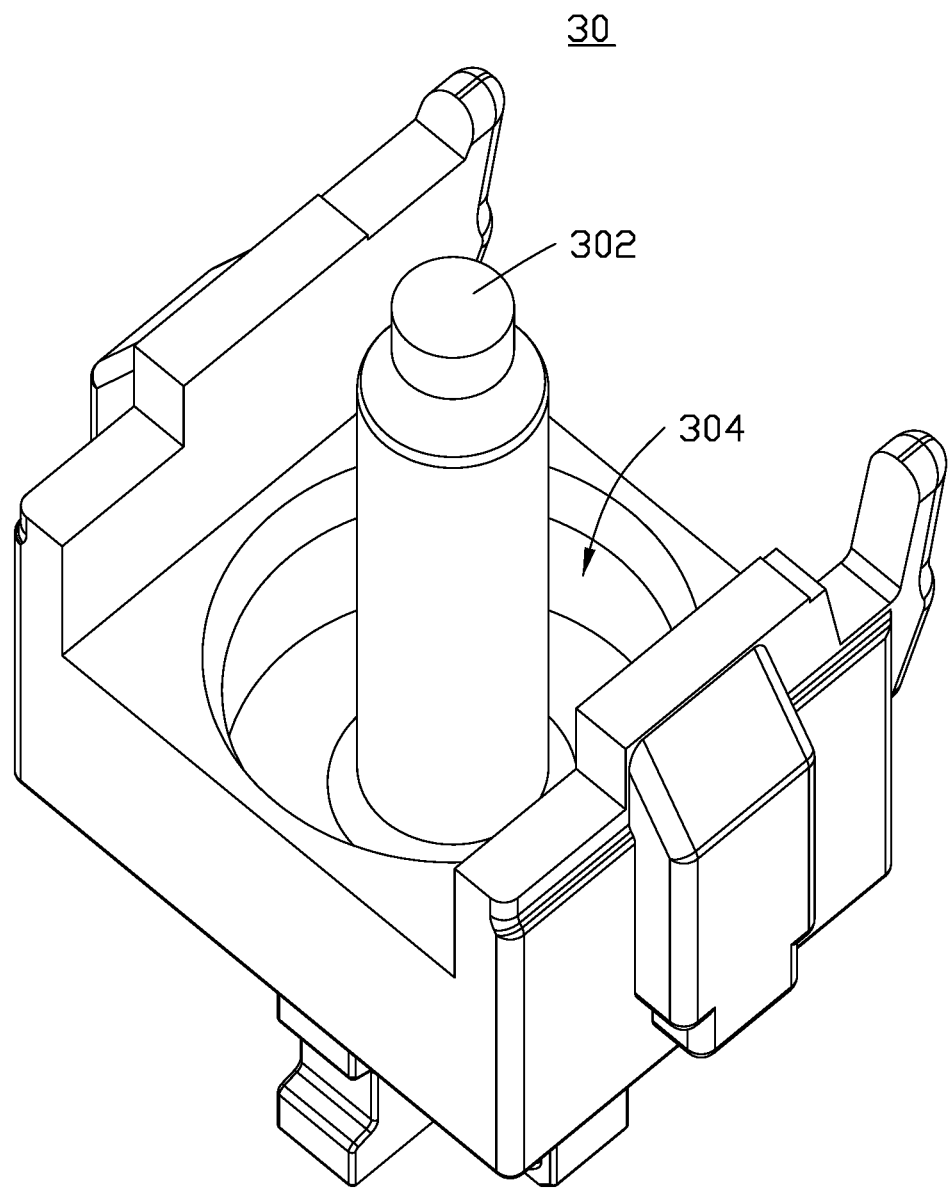
FIG. 5 is a bottom view of the movable element of FIG. 4.

Referring to FIG. 2, FIG. 4, and FIG. 5, the movable element 30 includes a body portion 301 and an extension portion 302 and a pushing portion 303 arranged on opposite sides of the body portion 301. A surface of the body portion 301 is recessed inward to form an accommodating cavity 304. The extension portion 302 is roughly cylindrical, and extends out of the accommodating cavity 304. The pushing portion 303 is protruded from a surface of the body portion 301 away from the extension portion 302, and the pushing portion 303 and the extension portion 302 are coaxially disposed. The body portion 301 defines a protruding portion 305, the body portion 301 has two side surfaces perpendicular to the surface where the accommodating cavity 304 is located, and the protruding portion 305 is formed by extending the side surfaces toward a first elastic piece 80. The movable element 30 may be, but is not limited to, a plunger.

Figure 7:
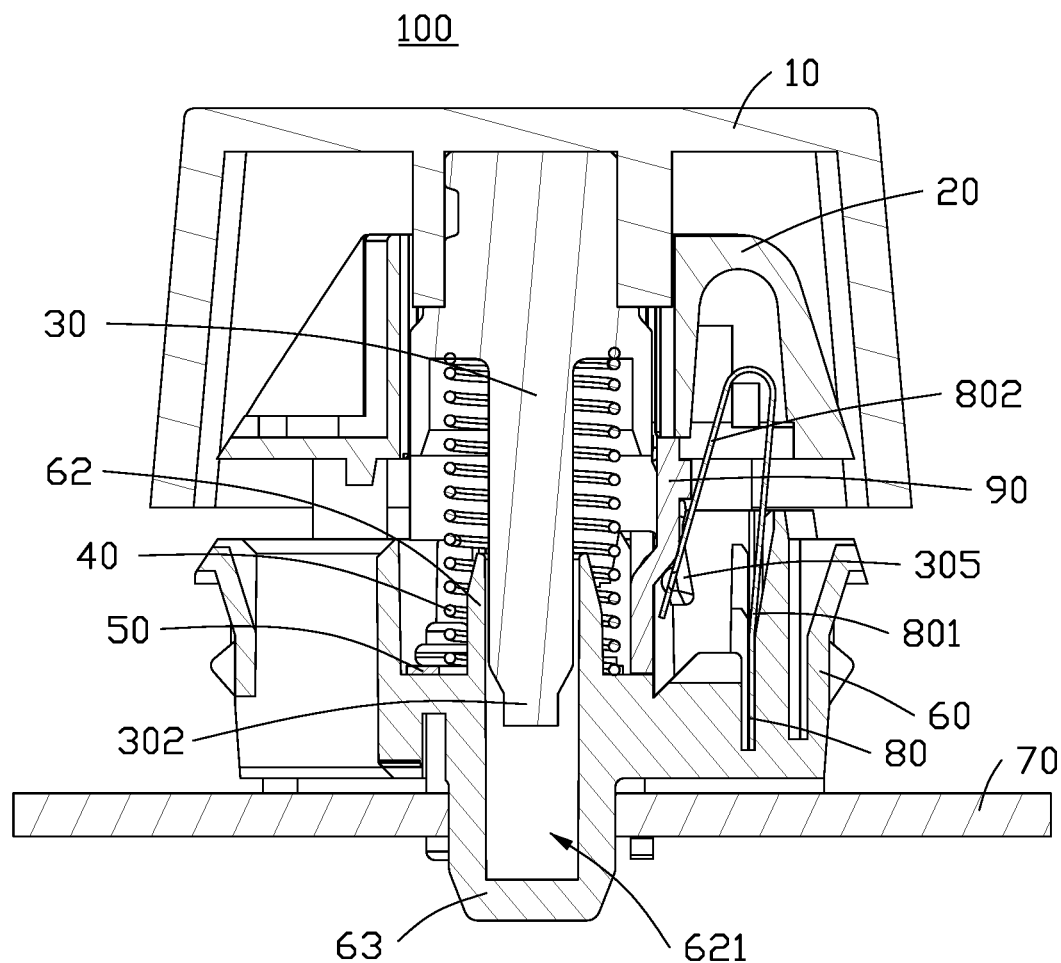
FIG. 7 is a cross-sectional view taken along view line I-I of FIG. 1.

Referring to FIGS. 2 and 7, the base 60 includes a main body 61 and a first connecting portion 62 and a second connecting portion 63 arranged on opposite sides of the main body 61. The first connecting portion 62 and the second connecting portion 63 are roughly cylindrical. The first connecting portion 62 is protruded from a surface of the main body 61 and defines an accommodating hole 621. The second connecting portion 63 is protruded from the surface of the main body 61 away from the first connecting portion 62, and the position of the second connecting portion 63 corresponds to the position of the first connecting portion 62. The accommodating hole 621 extends through the body 61 to the second connecting portion 63.

One end of the extension portion 302 away from the body portion 301 is accommodated in the accommodating hole 621. The elastic element 40 is sleeved on the extension portion 302 and the first connecting portion 62, and two ends of the elastic element 40 are respectively abutted against the body portion 301 of the movable element 30 and the main body 61 of the base 60. The elastic element 40 may be, but not limited to, a spring. The extension portion 302 and the first connecting portion 62 are configured for positioning the elastic element 40. In other embodiments, the extension portion 302 and the first connecting portion 62 may be omitted, and the elastic element 40 may be elastically resisted between the movable element 30 and the base 60.

The circuit board 70 is sleeved on the second connecting portion 63. In other embodiments, the second connecting portion 63 may be omitted, and the circuit board 70 may be directly fixed to the surface of the base 60 away from the elastic element 40.

Figure 3:
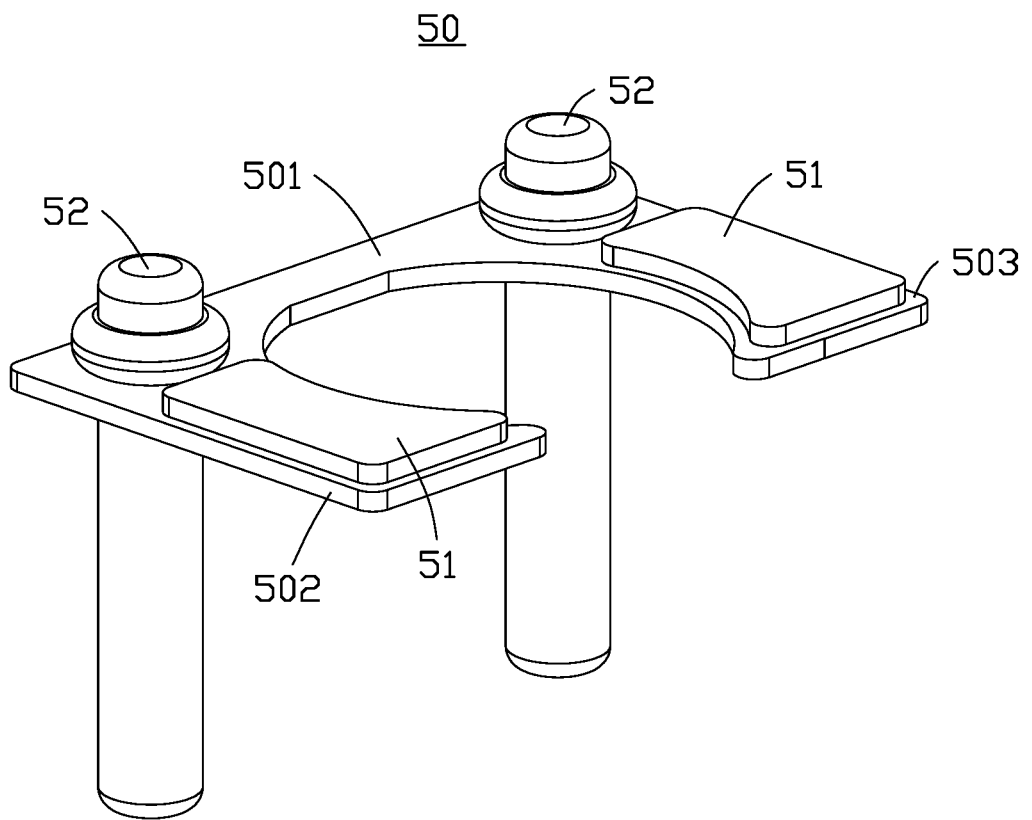
FIG. 3 is a diagrammatic view of a pressure sensing module of the key structure of FIG. 2.

Referring to FIG. 3, in this embodiment, the pressure sensing module 50 includes a pressure sensing element 51 and a conducting element 52. The position of the pressure sensing element 51 corresponds to the position of the movable element 30, thus, the pressure sensing element 51 can come into contact with the movable element 30 (referring to FIGS. 2 and 4) after being pressed. The pressure sensing element 51 is also used to monitor the pressure experienced by the movable element 30 (referring to FIGS. 2 and 4) and convert the pressure into a pressure signal. The conducting element 52 conducts the pressure signal to the circuit board 70 (referring to FIG. 2).

Furthermore, as shown in FIG. 3, the pressure sensing module 50 includes a first board 501, a second board 502, and a third board 503, and the second board 502 and the third board 503 are disposed on the same side of the first board 501. The second board 502 and the third board 503 both define a pressure sensing element 51, and the pressure sensing element 51 may be, but not limited to, a pressure sensor. After being pressed, the bottom of the body portion 301 can be in contact with the two pressure sensing elements 51. The first board 501 is further provided with two conducting elements 52, wherein one conducting element 52 is arranged close to the second board 502, and the other conducting element 52 is arranged close to the third board 503. The conducting element 52 may be, but is not limited to, solder pins. The conducting element 52 penetrates through the base 60 and is electrically connected to the circuit board 70. In this embodiment, the pressure sensing module 50 is approximately axially symmetrical about the vertical bisector of the first board 501, and the vertical bisector is approximately parallel to the extending directions of the second board 502 and the third board 503. The first board 501, the second board 502, and the third board 503 are formed in the shape of a half ring, and the half ring is arranged around the outer wall of the first connecting portion 62. The area of the two pressure sensing elements 51 that can sense the pressure exceeds 50% of the pressable area of the key cap 10. Thus, users do not need to press the center of the key cap 10, the pressure sensing element 51 can also quickly sense the pressure change, and can even use the unbalanced pressure on both sides to generate different pressure signals as extended operation commands.

Referring to FIG. 2, the upper cover 20 defines a snap-fit ear 202, the snap-fit ear 202 defines a clamping slot 203, the base 60 defines a clamping protrusion 601, and the clamping protrusion 601 is clamped with the clamping slot 203. Accordingly, the assembly and disassembly between the upper cover 20 and the base 60 are facilitated.

Figure 6:
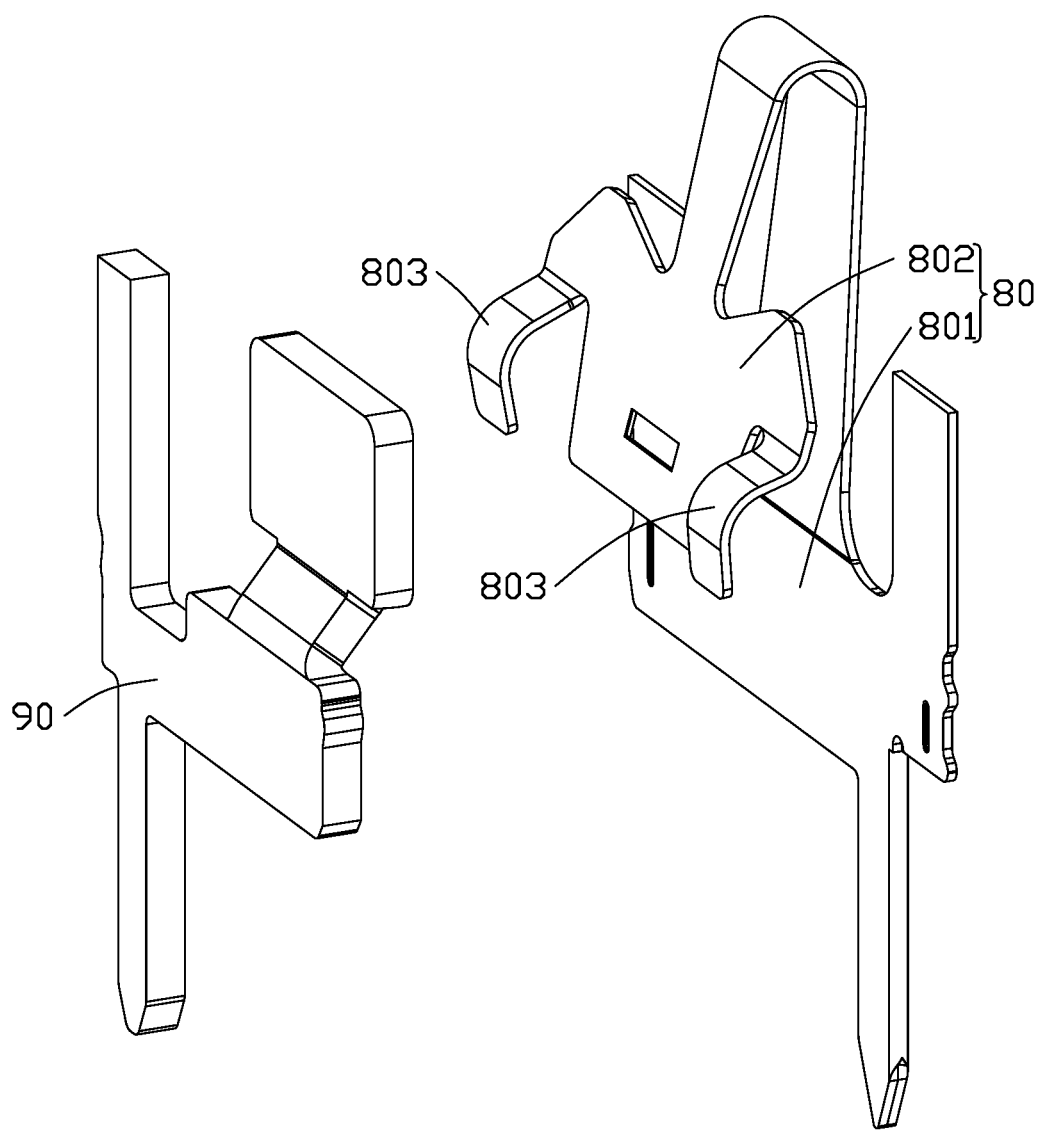
FIG. 6 is a diagrammatic view of a first elastic piece and a second elastic piece of the key structure of FIG. 2.

Referring to FIG. 2, FIG. 6, and FIG. 7, the key structure 100 further includes a first elastic piece 80 and a second elastic piece 90 arranged on the base 60. The first elastic piece 80 and the second elastic piece 90 are electrically connected to the circuit board 70, and the second elastic piece 90 is arranged between the first elastic piece 80 and the movable element 30.

Furthermore, as shown in FIG. 6, the first elastic piece 80 includes a fixed part 801 and a bent part 802 connected with the fixed part 801. Two arc-shaped protrusions 803 are symmetrically arranged on the bent part 802, and the arc-shaped protrusions 803 protrude toward the second elastic piece 90. Referring to FIGS. 4 and 6, the body portion 301 of the movable element 30 defines two protruding portions 305 protruding toward the bent part 802 of the first elastic piece 80. The positions of the two protruding portions 305 correspond to the positions of the two arc-shaped protrusions 803. The bent part 802 of the first elastic piece 80 and the second elastic piece 90 are in contact when the key structure 100 is not being pressed.

Referring to FIG. 7, when the user presses the key cap 10, the movable element 30 connected to the key cap 10 moves downward. At this time, the protruding portion 305 contacts the arc-shaped protrusion 803 and squeezes the bent part 802, so that the bent part 802 moves toward the fixed part 801 and separates from the second elastic piece 90. The first elastic piece 80 is not in contact with the second elastic piece 90, and the circuit board 70 outputs a corresponding signal. When the user continues to press down, the bottom of the body portion 301 of the movable element 30 is in contact with the pressure sensing element 51 (referring to FIG. 3) of the pressure sensing module 50, and the pressure sensing element 51 monitors the pressure on the movable element 30 and converts the pressure into a pressure signal, the conducting element 52 conducts the pressure signal to the circuit board 70, and the circuit board 70 outputs a corresponding signal. For example, after pressing the key cap 10 for several seconds, the same command can be repeatedly executed in word processing, and the speed of the repeated command is determined by the pressing pressure; in a fighting game, press the key cap 10 for several seconds, the strength of the attack can be determined according to the pressing force; when playing a music rhythm game, press the key cap 10 for several seconds to simulate the playing loudness of a real musical instrument according to the pressing force.

Second Embodiment

Figure 8:
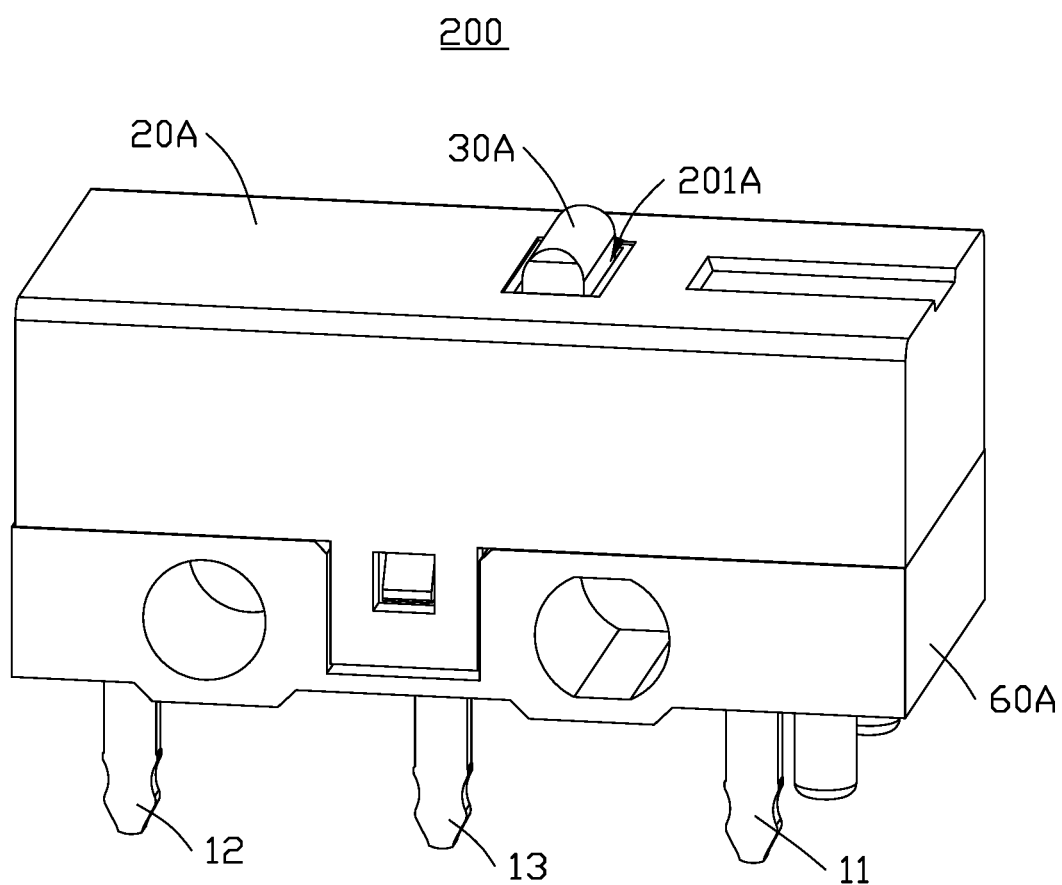
FIG. 8 is a diagrammatic view of a key structure according to another embodiment of the present disclosure.
Figure 9:
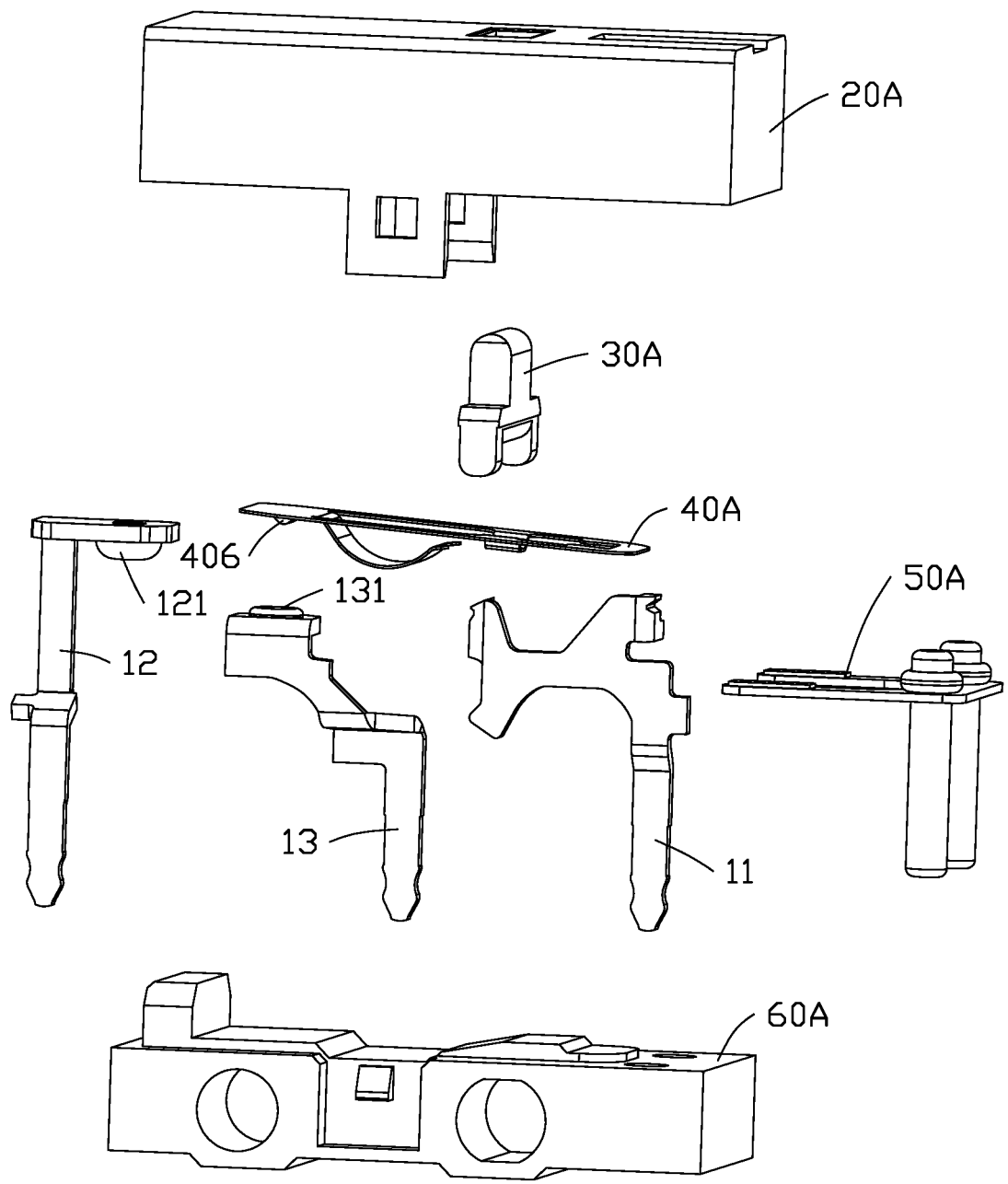
FIG. 9 is an exploded view of the key structure of FIG. 8.

Referring to FIGS. 8 and 9, the second embodiment provides a key structure 200, including an upper cover 20A, a movable element 30A, an elastic element 40A, a pressure sensing module 50A, a base 60A, and a first terminal 11. The upper cover 20A defines an opening 201A passing through the upper cover 20, and an end of the movable element 30A passes through the opening 201A and is exposed to the upper cover 20A. The pressure sensing module 50A is arranged on the base 60A, and the pressure sensing module 50A is electrically connected to the circuit board (not shown in FIGS. 8 and 9).

The structure and function of the pressure sensing module 50A in this embodiment are the same as those of the pressure sensing module 50 (referring to FIG. 3) in the first embodiment, which will not be repeated here.

Figure 10:
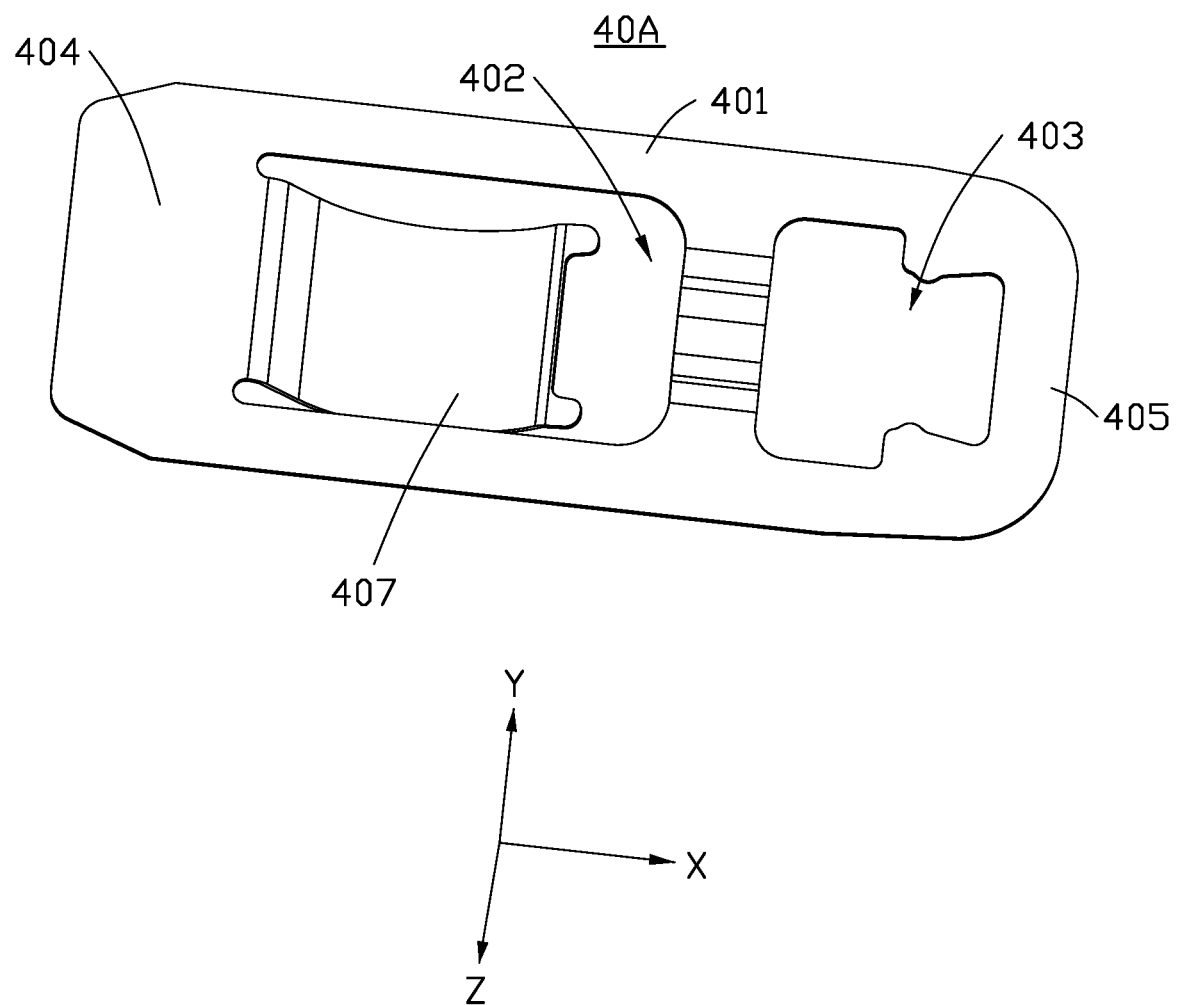
FIG. 10 is a diagrammatic view of an elastic element of the key structure of FIG. 9.
Figure 11:
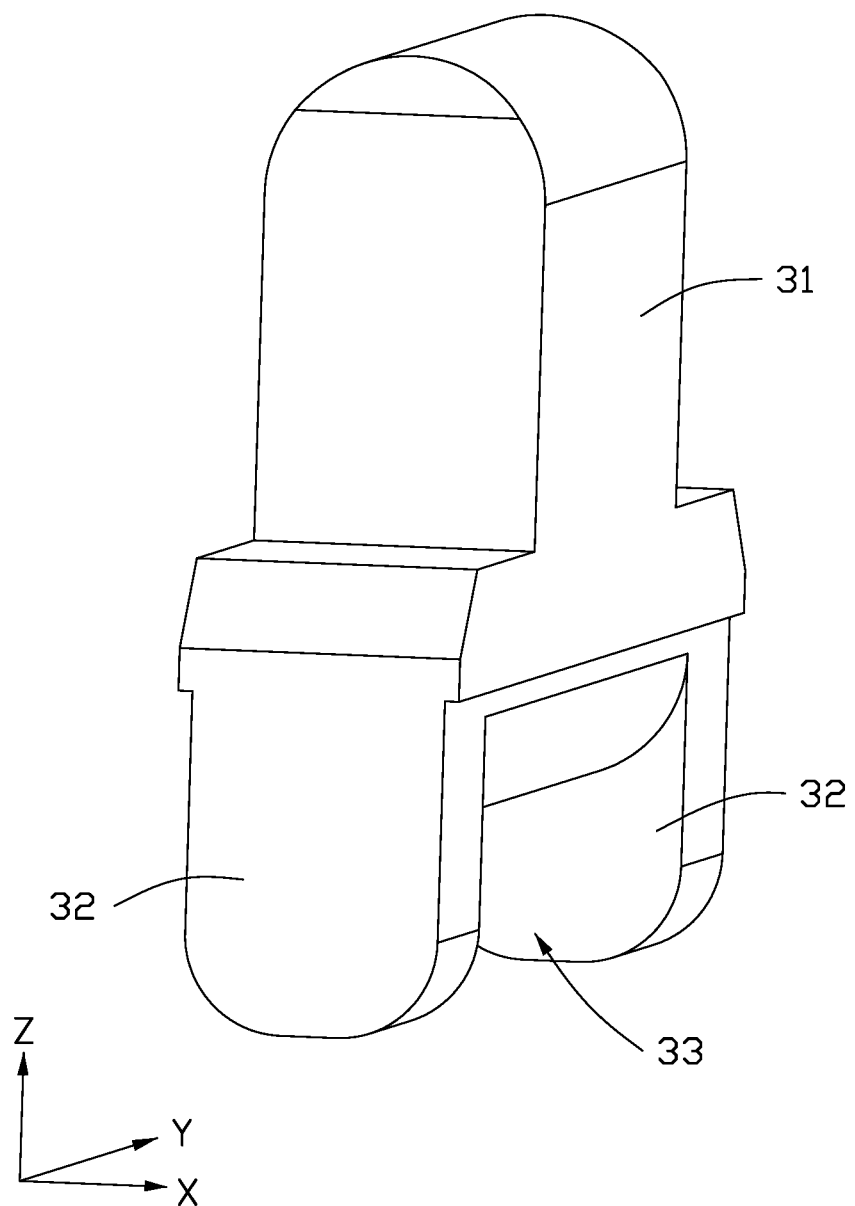
FIG. 11 is a diagrammatic view of a movable element of the key structure of FIG. 9.

Referring to FIG. 10, the elastic element 40A includes an element body 401, and a first slot 402 and a second slot 403 arranged on the element body 401. The first slot 402 is provided with a third elastic piece 407 fixed at one end and movable at the other end, the third elastic piece 407 is roughly arc-shaped. The element body 401 includes a movable end 404 close to the first slot 402 and a fixed end 405 close to the second slot 403, and the movable end 404 can move relative to the fixed end 405. Referring to FIG. 11, the movable element 30A includes a movable block 31 and two resisting blocks 32 extending from the bottom of the movable block 31 in a direction towards the elastic element 40A. The two resisting blocks 32 and a bottom surface of the movable block 31 form a groove 33, and the movable element 30A is arranged on the element body 401 of the elastic element 40A through the groove 33 and the two resisting blocks 32. Referring to FIGS. 10 and 11, the arrangement direction of the first slot 402 and the second slot 403 is defined as the first direction X, and the direction perpendicular to the first direction X in the plane of the element body 401 is the second direction Y, and the direction perpendicular to the first direction X and the second direction Y is the third direction Z. It can be understood that the third direction Z is the pressing direction. The groove 33 is arranged on the element body 401 along the second direction Y. The groove 33 cooperates with the two resisting blocks 32 to clamp the movable element 30A on the element body 401 between the first slot 402 and the second slot 403.

Figure 12:
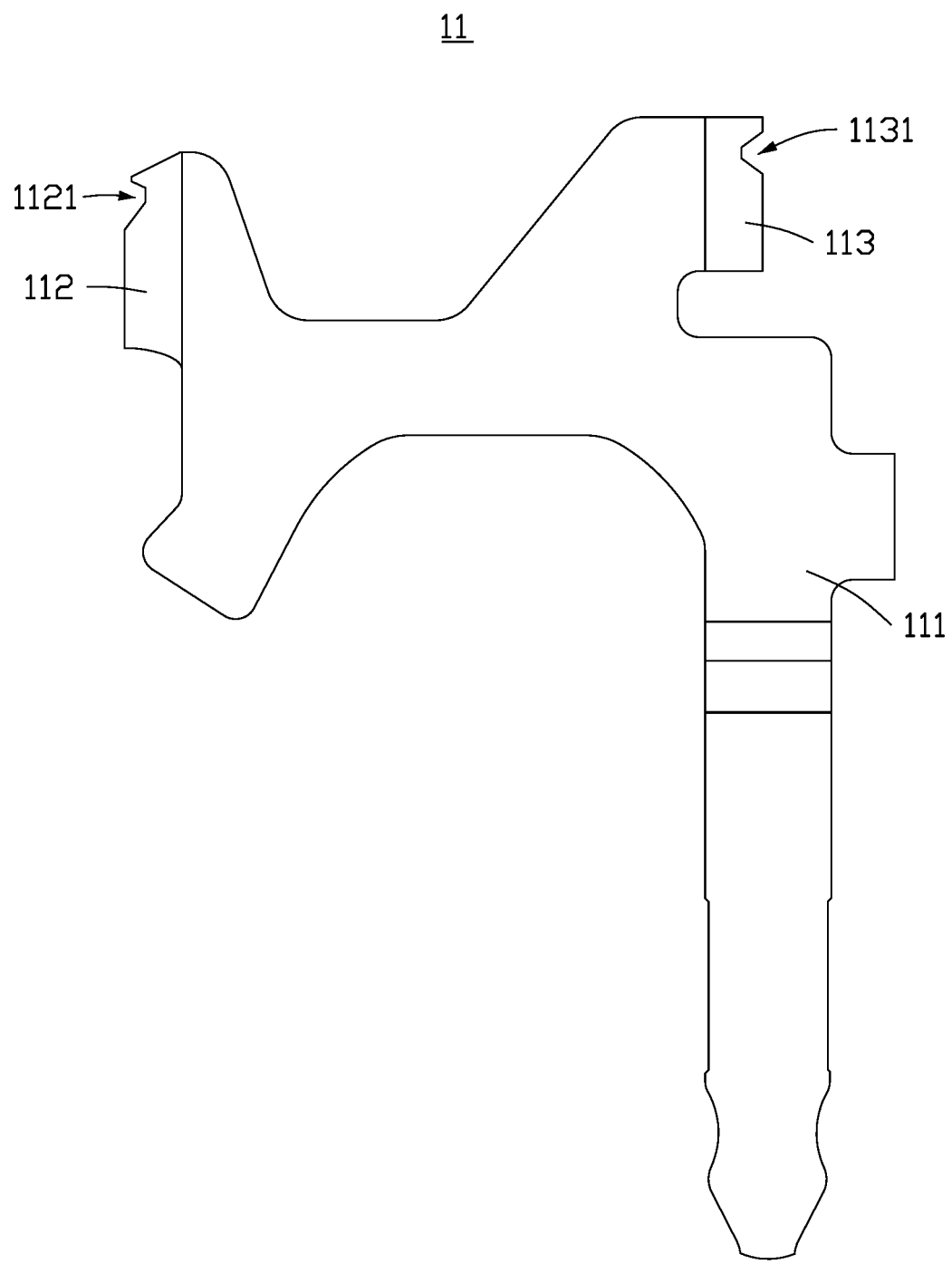
FIG. 12 is a diagrammatic view of a first terminal of the key structure of FIG. 9.

Referring to FIG. 12, the first terminal 11 includes a first terminal body 111 and a first protruding part 112 and a second protrusion 113 arranged on the first terminal body 111. The first terminal body 111 is roughly in a "7" shape. The first protruding part 112 is engaged with the third elastic piece 407 (referring to FIG. 10), and the second protruding part 113 is engaged with the second slot 403 (referring to FIG. 10). Furthermore, a first notch 1121 is formed on the outer edge side wall of the first protruding portion 112, and a second notch 1131 is formed on the outer edge side wall of the second protruding portion 113. The first notch 1121 is engaged with the third elastic piece 407, and the second notch 1131 is engaged with the second slot 403. The shapes of the first notch 1121 and the second notch 1131 may be, but are not limited to, a trapezoid or a V-shape. The elastic element 40A is fixed on the first terminal 11 through the engagement between the second notch 1131 and the second slot 403 and the engagement between the first notch 1121 and the third elastic piece 407.

Through the cooperation between the first notch 1121 and the third elastic piece 407 and the cooperation between the second notch 1131 and the second slot 403, the stability and wear resistance of the key structure are improved, and the product life and the conductivity can also be improved.

As shown in FIG. 9, the key structure 200 in this embodiment further includes a second terminal 12 and a third terminal 13. The end of the second terminal 12 close to the upper cover 20A defines a first contact 121 towards the elastic element 40A, and the end of the third terminal 13 close to the elastic element 40A defines a second contact 131. The movable end 404 of the elastic element 40A defines a third contact 406 facing the second contact 131, and the third contact 406 is disposed between the first contact 121 and the second contact 131.

Referring to FIGS. 8 and 9, the base 60A is adapted to the upper cover 20A and forms an accommodation space, the elastic element 40A, the pressure sensing module 50A, and the first protruding part 112 and the second protruding part 113 of the first terminal 11 are all arranged in the accommodation space. The base 60A defines a through hole (not shown in the drawings) passing through the base 60A, and the second terminal 12, the third terminal 13, and the first terminal body 111 respectively pass through the through hole and protrude out.

When the key structure is not being pressed, the elastic element 40A is in contact with the first contact 121 of the second terminal 12, which is a rest state (Off). After being pressed, the movable block 31 of the movable element 30A squeezes the element body 401 located at the first slot 402 and the second slot 403. Under the action of the elastic force of the third elastic piece 407, the third contact 406 contacts the second contact 131 to form a conduction circuit and output a corresponding signal.

When the user continues to press down, the two resisting blocks 32 of the movable element 30A come into contact with the pressure sensing elements 51, the pressure sensing elements 51 monitor the pressure on the movable element 30A and converts the pressure into a pressure signal, and the conducting elements 52 conduct the pressure signal to the circuit board. The circuit board outputs a corresponding signal. For example, after pressing for several seconds, the same command can be repeatedly executed in word processing, and the speed of the repeated command is determined by the pressing pressure; in a fighting game, press for several seconds, the strength of the attack can be determined according to the pressing force; when playing a music rhythm game, press for several seconds to simulate the playing loudness of a real musical instrument according to the pressing force.

In the key structure of the present application, a pressure sensing module electrically connected with a circuit board is set to monitor the pressure pressed by the user, and then a composite signal can be provided according to the pressure of the user's pressing to provide more commands. The key structure of the present application is sensitive, simple, and efficient in operation, which can improve the user's experience.

The above descriptions are some specific embodiments of the present application, but the actual application process cannot be limited only to these embodiments. For those of ordinary skill in the art, other modifications and changes made according to the technical concept of the present application should all belong to the protection scope of the present application.

What is claimed is:
1. A key structure comprising:
a key cap;
a movable element, an end of the movable element being connected to the key cap;
a base defining an accommodating hole, another end of the movable element away from the key cap being accommodated in the accommodating hole;
an elastic element elastically resisting between the movable element and the base;
a pressure sensing module arranged on the base, the pressure sensing module comprising a pressure sensing element and a conducting element, the pressure sensing element being configured to be in contact with the movable element after being pressed by a pressure, monitoring the pressure on the movable element, and converting the pressure into a pressure signal; and
a circuit board electrically connected to the pressure sensing module, and the conducting element being configured to conduct the pressure signal to the circuit board;
wherein the pressure sensing module further comprises a first board, a second board, and a third board, the second and the third boards are arranged on a same side of the first board; the pressure sensing element is arranged on both the second and the third boards; two conducting elements are provided on the first board, one of the two conducting element is arranged near the second board, and another one of the two conducting elements is arranged near the third board.

2. The key structure of claim 1, wherein the movable element comprises a body portion, an extension portion, and a pushing portion, the extension portion and the pushing portion are arranged on opposite sides of the body portion; the pushing portion is connected to the key cap, the extension portion is partially accommodated in the accommodating hole, and the elastic element is sleeved on the extension portion; when the movable element is pressed, the body portion is in contact with the pressure sensing element.

3. The key structure of claim 1, further comprising a first elastic piece and a second elastic piece arranged on the base, wherein the first elastic piece and the second elastic piece are electrically connected to the circuit board, and the second elastic piece is arranged between the first elastic piece and the movable element.

4. The key structure of claim 3, wherein the first elastic piece comprises a fixed part and a bent part connected to the fixed part, the movable element comprises a body portion defining a protruding portion, and the bent part is configured to be in contact with the protruding portion and move toward the fixed part when the movable element is pressed.

5. The key structure of claim 1, further comprising an upper cover comprising an opening and a snap-fit ear, wherein an end of the movable element passes through the opening and connects to the key cap; the snap-fit ear defines a clamping slot, the base defines a clamping protrusion, and the clamping protrusion is engaged with the clamping slot.

6. A key structure comprising:
an upper cover defining an opening, the opening passing through the upper cover;
a base, the base and the upper cover cooperatively forming an accommodation space;
an elastic element being accommodated in the accommodation space, the elastic element comprising an element body, a first slot and a second slot arranged on the element body, and a third elastic piece arranged in the first slot;
a first terminal comprising a first terminal body, and a first protruding part and a second protruding part arranged on the first terminal body, the first protruding part engaged with the third elastic piece, the second protruding part engaged with the second slot;
a movable element comprising a movable block and two resisting blocks extending from the movable block, wherein the two resisting blocks and a bottom surface of the movable block cooperatively form a groove, the groove is engaged with the element body located at the first slot and the second slot, the movable block is configured to press against the elastic element to drive the elastic element to move when the movable element is pressed;
a pressure sensing module arranged on the base, the pressure sensing module comprising a pressure sensing element and a conducting element, the pressure sensing element configured to be in contact with the resisting block of the movable element after being pressed by a pressure, monitoring the pressure on the movable element, and converting the pressure into a pressure signal; and
a circuit board electrically connected to the pressure sensing module, and the conducting element being configured for conducting the pressure signal to the circuit board.

7. The key structure of claim 6, wherein the pressure sensing module further comprises a first board, a second board, and a third board, the second and the third boards are arranged on a same side of the first board; the pressure sensing element is arranged on both the second and the third boards; the first board is provided with two conducting elements, one of the two conducting element is arranged near the second board, and another one of the two conducting elements is arranged near the third board.

8. The key structure of claim 6, further comprising a second terminal and a third terminal; wherein the second terminal defines a first contact, and the third terminal defines a second contact; the element body comprises a movable end close to the first slot and a fixed end close to the second slot; the fixed end is engaged with the second fixed end; the movable end defines a third contact, the third contact is arranged between the first contact and the second contact, and is configured to be in contact with the first contact or the second contact.

9. The key structure of claim 6, wherein the elastic element, the pressure sensing module, the first protruding part, and the second protruding part are all arranged in the accommodation space; the base defines a through hole, and each of the second terminal, the third terminal, and the first terminal body passes through the through hole and protrudes from the base.

* * * * *